US008554198B2

(12) United States Patent
Aoki et al.

(10) Patent No.: US 8,554,198 B2
(45) Date of Patent: Oct. 8, 2013

(54) TEST APPARATUS FOR TESTING MOBILE COMMUNICATION TERMINAL AND MESSAGE DISPLAY METHOD FOR DISPLAYING MESSAGE ASSOCIATED WITH THE TESTING

(75) Inventors: Kazunori Aoki, Atsugi (JP); Toyohiro Kayanuma, Atsugi (JP); Takayuki Awano, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 0 days.

(21) Appl. No.: 13/364,384

(22) Filed: Feb. 2, 2012

(65) Prior Publication Data
US 2012/0214479 A1 Aug. 23, 2012

(30) Foreign Application Priority Data
Feb. 18, 2011 (JP) .................. 2011-033185

(51) Int. Cl.
*H04W 24/00* (2009.01)
(52) U.S. Cl.
USPC .......................................... 455/423; 455/424
(58) Field of Classification Search
None
See application file for complete search history.

(56) References Cited

U.S. PATENT DOCUMENTS 6,421,071 B1 * 7/2002 Harrison ..................... 715/787
2006/0270398 A1 * 11/2006 Nakamura et al. ............ 455/423

FOREIGN PATENT DOCUMENTS

| JP | 2008193314 | 8/2008 |
| JP | 2012-151525 A | 8/2012 |

* cited by examiner

*Primary Examiner* — Jinsong Hu
*Assistant Examiner* — Magdi Elhag
(74) *Attorney, Agent, or Firm* — Pearne & Gordon LLP (57) ABSTRACT

A test apparatus for a mobile communication terminal is provided with a pseudo base station and display and control units. The control unit includes a analysis unit and a tag addition unit. The analysis unit acquires and analyzes the messages from the base station to take out information from the messages. The tag addition unit detects a group of series messages which have a mutual association and are consecutive in time sequence among the messages analyzed and to add a tag for identifying each group of messages to a detected group of messages. The control unit displays the tag together with the series of messages so as to identify the respective groups of messages.

14 Claims, 7 Drawing Sheets

F I G. 1

| | U-S | Message | Description |
|---|---|---|---|
| 1 | → | L2 message | Random Access Preamble |
| 2 | ← | L2 message | Random Access Response |
| 3 | → | RRCConnectionRequest | |
| 4 | | ---Setup--- | |
| 5 | ← | RRCConnectionSetup | |
| 6 | → | RRCConnectionSetupComplete | ATTACH REQUEST |
| 7 | | ---Registration--- | |
| 8 | ← | DLInformationTransfer | IDENTITY REQUEST |
| 9 | → | ULInformationTransfer | IDENTITY RESPONSE |
| 10 | ← | DLInformationTransfer | IDENTITY REQUEST |
| 11 | ← | DLInformationTransfer | AUTHENTICATION REQUEST |
| 12 | → | ULInformationTransfer | AUTHENTICATION RESPONSE |
| 13 | ← | DLInformationTransfer | SECURITY MODE COMMAND |
| 14 | → | ULInformationTransfer | SECURITY MODE COMPLETE |
| 15 | ← | DLInformationTransfer | ACTIVATE TEST MODE |
| 16 | → | ULInformationTransfer | ACTIVATE TEST MODE COMPLETE |
| 17 | ← | SecurityModeCommand | |
| 18 | → | SecurityModeComplete | |
| 19 | ← | UECapabilityEnquiry | |
| 20 | → | UECapabilityInformation | |
| 21 | ← | RRCCONNReconfiguration | ATTACH ACCEPT |
| 22 | → | RRCCONNReconfigurationComplete | |
| 23 | → | ULInformationTransfer | ATTACH COMPLETE |
| 24 | ← | RRCConnectionRelease | |
| 25 | | ---NW Origination--- | |
| 26 | ← | Paging | SFN : 661 Subframe : 9 |
| 27 | → | L2 message | Random Access Preamble |
| 28 | ← | L2 message | Random Access Response |
| 29 | → | RRCConnectionRequest | |
| 30 | | ---setup--- | |
| 31 | ← | RRCConnectionSetup | |
| 32 | → | RRCConnectionSetupComplete | |
| 33 | ← | SecurityModeCommand | |
| 34 | → | SecurityModeComplete | |
| 35 | ← | RRCCONNReconfiguration | |
| 36 | → | RRCCONNReconfigurationComplete | |
| 37 | | ---Reconfiguration--- | |
| 38 | ← | RRCCONNReconfiguration | |
| 39 | → | RRCCONNReconfigurationComplete | |
| 40 | | ---NW Release--- | |
| 41 | ← | RRCConnectionRelease | |

FIG. 2

| Communication condition | Tag |
|---|---|
| Receive RRCConnectionRequest | Setup |
| Contents of RRCConnectionSetupComplete are ATTACH REQUEST | Registration |
| Change relevant parameter when call status is Connected | Reconfiguration |
| Perform Start Call when call status is Connected | NW Origination |
| Perform End Call when call status is Connected | NW Release |
| ... | ... |

| RRC | NAS | | |
|---|---|---|---|
| Field | | Value | Type |
| ⊟ UL-DCCH-Message | | | SEQUENCE |
| ⊟ message | | C1 | CHOICE |
| ⊟ c1 | | rrcConnectionSetupComplete | CHOICE |
| ⊟ rrcConnectionSetupComplete | | | SEQUENCE |
| ├ rrc-TransactionIdentifier | | 0 | INTEGER |
| ├ criticalExtensions | | c1 | CHOICE |
| ⊟ c1 | | rrcConnectionSetupComplete-r8 | CHOICE1 |
| ⊟ rrcConnectionSetupComplete-r8 | | | SEQUENCE |
| ├ selectedPLMN-Identity | | 10 | INTEGER |
| ⊟ registeredMME | | | SEQUENCE |
| ├ plmn-Identity | | 1 | SEQUENCE |
| ├ mmegi | | 0000000000000001 | BIT STRING |
| └ mmec | | 00000001 | BIT STRING |
| ├ dedicatedInfoNAS | | 170000000040741208BF600F110000... | OCTET STRING |
| nonCriticalExtension | | | SEQUENCE |

Details →

FIG. 4B

| RRC | NAS | | |
|---|---|---|---|
| Field | | Value | |
| ⊟ Attach request | | | |
| ⊟ Security header type | | | |
| └ Security header type | | Plain NAS message, not security | |
| ⊟ EPS mobility management protocol discriminator | | | |
| └ protocol discriminator | | 7 | |
| ⊟ Attach request message identity | | | |
| └ Message type | | 41 | |
| ├ NAS key set identifier | | | |

| U-S | Message | Description |
| --- | --- | --- |
| ← | UECapabilityEnquiry | |
| → | UECapabilityInformation | |
| ← | RRCCONNReconfiguration | ATTACH ACCEPT |
| → | RRCCONNReconfigurationComplete | |
| → | ULInformationTransfer | ATTACH COMPLETE |
| ← | RRCConnectionRelease | |
| | ---NW Origination--- | |
| ← | Paging | SFN : 661  Subframe : 9 |
| → | L2 message | Random Access Preamble |
| ← | L2 message | Random Access Response |
| → | RRCConnectionRequest | |
| | ---Setup--- | |
| ← | RRCConnectionSetup | |
| → | RRCConnectionSetupComplete | |
| ← | SecurityModeCommand | |
| → | SecurityModeComplete | |
| ← | RRCCONNReconfiguration | |
| → | RRCCONNReconfigurationComplete | |
| | ---Reconfiguration--- | |
| ← | RRCCONNReconfiguration | |
| → | RRCCONNReconfigurationComplete | |
| | ---NW Release--- | |
| ← | RRCConnectionRelease | |

FIG. 5

| U-S | Message | Description |
| --- | --- | --- |
| → | RRCConnectionSetupComplete | ATTACH REQUEST |
| | ---Registration--- | |
| ← | DLInformationTransfer | IDENTITY REQUEST |
| → | ULInformationTransfer | IDENTITY RESPONSE |
| ← | DLInformationTransfer | IDENTITY REQUEST |
| ← | DLInformationTransfer | AUTHENTICATION REQUEST |
| → | ULInformationTransfer | AUTHENTICATION FAILURE |
| ← | DLInformationTransfer | AUTHENTICATION REQUEST |
| ⋮ | ⋮ | ⋮ |

FIG. 6

| U-S | Message | Description |
|---|---|---|
| ← | UECapabilityEnquiry | |
| → | UECapabilityInformation | |
| ← | RRCCONNReconfiguration | ATTACH ACCEPT |
| → | RRCCONNReconfigurationComplete | |
| → | ULInformationTransfer | ATTACH COMPLETE |
| ← | RRCConnectionRelease | |
| | ---NW Origination--- | |
| ← | Paging | SFN: 661 Subframe: 9 |
| → | L2 message | Random Access Preamble |
| ← | L2 message | Random Access Response |
| → | RRCConnectionRequest | |
| | ---setup--- | |
| ← | RRCConnectionSetup | |
| → | RRCConnectionSetupComplete | |
| ← | SecurityModeCommand | |
| → | SecurityModeComplete | |
| ← | RRCCONNReconfiguration | |
| → | RRCCONNReconfigurationComplete | |
| | ---Reconfiguration--- | |
| ← | RRCCONNReconfiguration | |
| → | RRCCONNReconfigurationComplete | |
| | ---NW Release--- | |
| ← | RRCConnectionRelease | |

F I G. 7

F I G. 8

US 8,554,198 B2

TEST APPARATUS FOR TESTING MOBILE COMMUNICATION TERMINAL AND MESSAGE DISPLAY METHOD FOR DISPLAYING MESSAGE ASSOCIATED WITH THE TESTING

CROSS-REFERENCE TO RELATED APPLICATIONS

This application is based upon and claims the benefit of priority from prior Japanese Patent Application No. 2011-033185, filed Feb. 18, 2011, the entire contents of which are incorporated herein by reference.

BACKGROUND OF THE INVENTION

1. Field of the Invention

The present invention relates to a test apparatus for testing a mobile communication terminal such as cell phone or mobile terminal, and a method for displaying a message associated with the testing.

2. Description of the Related Art

When a communication terminal such as cell phone is newly developed, a test needs to be done as to whether the developed communication terminal can normally operate in an actual use environment. However, it is so difficult to exchange communication information for various tests between the newly-developed communication terminal and an operating actual base station and thereby to test whether the newly-developed communication terminal can normally operate.

Thus, there is known a test apparatus for testing whether the newly-developed communication terminal can normally operate when the newly-developed communication terminal is connected to a pseudo base station having a base station function and various items of communication information are exchanged between the communication terminal and the pseudo base station. The document disclosing the test apparatus therein is JP-A 2008-193314 (KOKAI), for example. The test apparatus has a trace function of acquiring various messages exchanged between a mobile communication terminal to be tested and a pseudo base station and displaying the same as trace information indicating a communication history on a display. The trace function is used to display and output a plurality of items of detailed and time-sequential log information of the communication information as the trace information, thereby easily discovering an abnormality occurrence cause when the mobile communication terminal to be tested cannot normally operate.

In recent years, W-CDMA (Wideband-Code Division Multiple Access) or its next-generation communication standard called LTE (Long Term Evolution) has been introduced as a communication standard of mobile communication terminals to further enhance the speed of communication. Under such a situation, the amount of messages exchanged between the pseudo base station and the mobile communication terminal and the amount of trace information necessary to be processed per unit time increase.

However, a conventional test apparatus can only display a large amount of messages exchanged for test in time sequence, and thus there is a problem that it is difficult for a tester to find a desired message and visibility is poor.

BRIEF SUMMARY OF THE INVENTION

An object of the present invention is to provide a test apparatus for testing a mobile communication terminal capable of displaying messages, which is further enhanced in its visibility than a conventional test apparatus, and a message display method of displaying the messages in the testing.

According to an aspect of the present invention, there is provided a test apparatus for a mobile communication terminal including:

a pseudo base station (10) configured to exchange messages with the mobile communication terminal (2) to be tested;

a display unit (22); and a display control unit (30) configured to display a plurality of messages exchanged by the pseudo base station in time sequence on the display unit, wherein the display control unit includes:

a message analysis unit (31) configured to acquire and analyze the messages from the pseudo base station; and a tag addition unit (33) configured to detect a group of messages configured of a series of messages which have a mutual association and are consecutive in time sequence among the messages analyzed by the message analysis unit and to add a tag for identifying each group of messages to a detected group of messages, and the display control unit is configured to display the tag together with the series of messages on the display unit so as to identify the respective groups of messages.

With the thus-configured test apparatus for mobile communication terminal, since a series of groups of messages can be detected and a detected group of messages is added with a tag and displayed, the messages can be displayed with higher visibility than ever.

According to another aspect of the present invention, there is provided a test apparatus for a mobile communication terminal in which the display control unit is configured to display the tag associated with the group of messages at a display position immediately before the series of messages configuring the group of messages.

With the thus-configured test apparatus for the mobile communication terminal, since a tag associated with a group of messages is displayed at the display position immediately before a series of messages configuring the group of messages, the messages can be displayed with higher visibility than ever.

According to still another aspect of the present invention, there is provided a test apparatus for a mobile communication terminal in which the display control unit further includes a table storage unit (32) configured to store a communication condition tag table associating a predetermined communication condition with the tag, and the tag addition unit detects the group of messages based on the communication condition tag table and adds the tag.

With the thus-configured test apparatus for the mobile communication terminal, a group of messages can be detected based on the communication condition tag table and a tag can be added to each detected group of messages.

Further, according to still another aspect of the present invention, there is provided a test apparatus for a mobile communication terminal in which the display control unit further includes a tag search unit (36) configured to search a predetermined tag from a plurality of tags and a plurality of groups of messages associated with the tags, and is configured to display a tag searched by the tag search unit and the series of messages configuring the group of messages associated with the tag on the display unit.

With the thus-configured test apparatus for the mobile communication terminal, the test apparatus for mobile communication terminal according to another aspect of the present invention can search and display a tag to be searched from a group of message.

Furthermore, according to still another aspect of the present invention, there is provided a test apparatus for a mobile communication terminal in which the display control unit further includes a cursor display unit (34a) configured to display a cursor indicating that one message displayed on the display unit is selected on the display unit and an identification display control unit (34) configured to identify and display at least one message displayed on the display unit, and the identification display control unit is configured to identify and display a group of messages including a message selected by the cursor and a group of messages not including a message selected by the cursor on the display unit.

With the thus-configured test apparatus for mobile communication terminal, a group of messages with the cursor thereon and other group of messages are identified and displayed to be easily recognized for a tester.

According to another aspect of the present invention, there is provided a test apparatus for a mobile communication terminal in which the display control unit is configured to identify and display an error message indicating an error among the messages and a different message from the error message on the display unit.

According to still another aspect of the present invention, there is provided a test apparatus for a mobile communication terminal in which the display control unit further includes an error message search unit (37) configured to search the error message, and is configured to identify and display an error message searched by the error message search unit on the display unit.

With the thus-configured test apparatus for the mobile communication terminal, an error message can be identified and displayed to be easily recognized for a tester. The error message search unit is provided thereby to search and display an error message.

According to still another aspect of the present invention, there is provided a message display method for a testing the mobile communication terminal, including: exchanging messages with the mobile communication terminal (2) to be tested; and displaying the exchanged messages in time sequence,
the method including:
a message analysis step (S12) of acquiring and analyzing the exchanged messages; and
a tag addition step (S14) of detecting a group of messages configured of a series of messages which have a mutual association and are consecutive in time sequence among the messages analyzed in the message analysis step, and adding a tag for identifying each group of messages for a detected group of messages,
wherein the display step (S15) is configured to display the tag together with the series of messages so as to identify the respective groups of messages.

With the thus-configured message display method, a series of groups of messages are detected and each detected group of messages is added with a tag and displayed, and thus the messages can be displayed with higher visibility than ever.

DETAILED DESCRIPTION OF THE INVENTION

A test apparatus for testing a mobile communication terminal and a message display method of displaying a message in the testing according to an embodiment of the present invention will be described below with reference to the drawings.

In the embodiment described herein, there will be described a test apparatus for mobile communication terminal applied to a test of a mobile communication terminal configured to communicate based on LTE communication standard.

Figure 1:
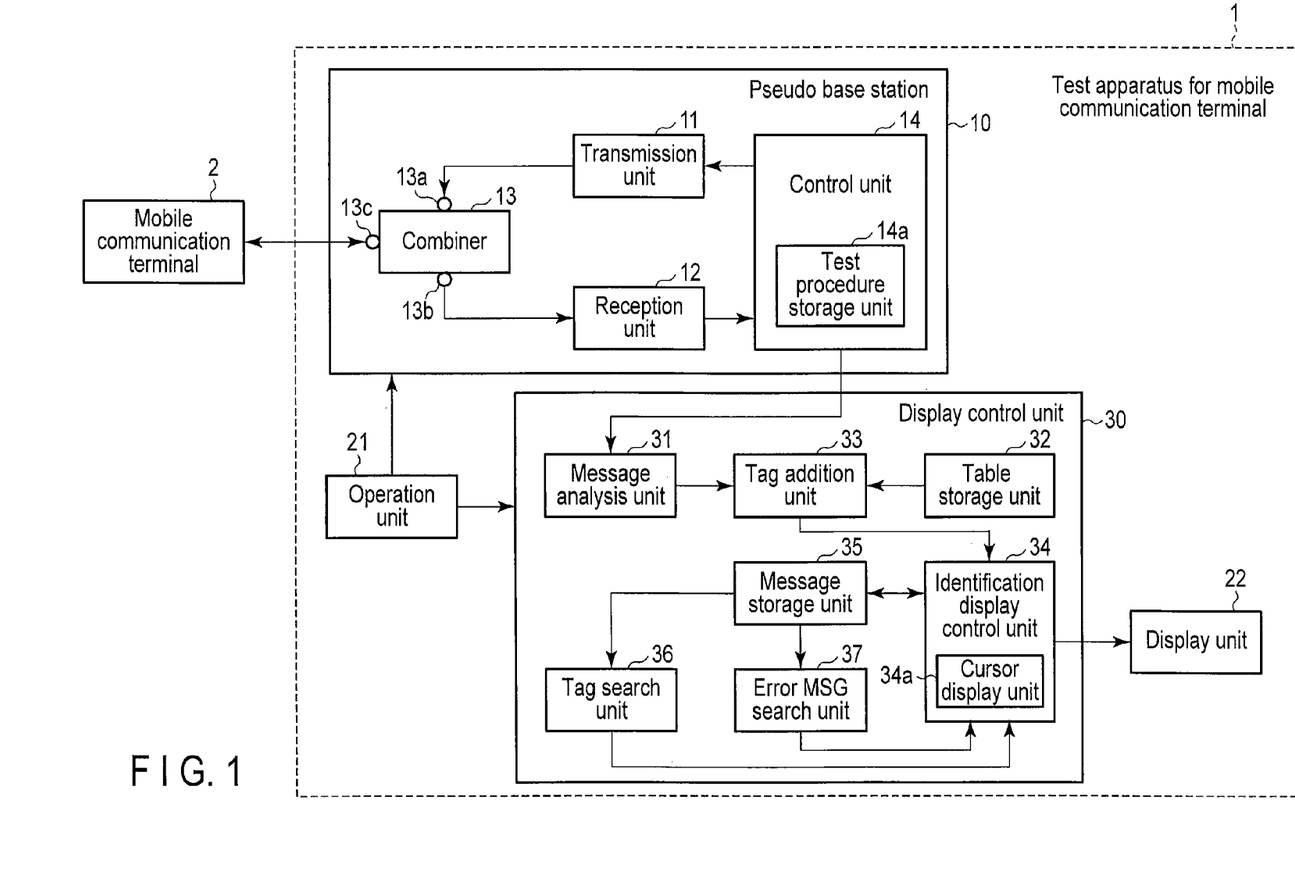
FIG. 1 is a block diagram schematically showing a test apparatus for testing a mobile communication terminal according to an embodiment of the present invention.

As shown in FIG. 1, a test apparatus for mobile communication terminal 1 according to the embodiment is configured to test a mobile communication terminal 2, and includes a pseudo base station 10 configured to communicate with the mobile communication terminal 2, an operation unit 21 configured to operate the test apparatus 1, a display unit 22 configured to display a message or measurement data associated with a test, and a display control unit 30 configured to control the display unit 22.

The pseudo base station 10 includes a transmission unit 11 configured to generate a transmission signal, a reception unit 12 configured to receive a reception signal, a combiner 13 configured to combine the transmission unit 11 and the reception unit 12, and a control unit 14 configured to control the transmission unit 11 and the reception unit 12.

The transmission unit 11 is configured to modulate a carrier wave having a frequency designated by the control unit 14 in a predetermined modulation system and to output it as a base station signal to the combiner 13. The operation of the transmission unit 11 is controlled by the control unit 14.

The reception unit 12 is configured to receive a signal from the mobile communication terminal 2 as a terminal to be tested via the combiner 13. The operation of the reception unit 12 is controlled by the control unit 14.

The combiner 13 includes a terminal 13a connected to the transmission unit 11, a terminal 13b connected to the reception unit 12, and a terminal 13c connected to the mobile communication terminal 2. With the structure, the combiner 13 is configured to receive a transmission signal from the transmission unit 11 at the terminal 13a and output it from the terminal 13c to the mobile communication terminal 2, and to receive a signal transmitted by the mobile communication terminal 2 at the terminal 13c and output it from the terminal 13b to the reception unit 12.

The control unit 14 includes a test procedure storage unit 14a configured to store test procedure data of each test performed on the mobile communication terminal 2 to be tested. The test procedure is set by tester's operating the operation unit 21 described later. The control unit 14 is configured to control the operations of the transmission unit 11, the reception unit 12 and the combiner 13 and to output a message exchanged between the transmission unit 11 and the reception unit 12 to the display control unit 30 based on the test procedure.

The operation unit 21 corresponds to an interface which a user as tester directly operates, and is configured of a display configured to display a setting screen for setting a test condition or test procedure, identifying and displaying a message, and setting a cursor operation, for example, an input device such as keyboard, dial or mouse, and a control circuit configured to control them.

The display unit 22 is configured of a liquid crystal display, for example, and is configured to display a message or measurement data under control of the display control unit 30.

The display control unit 30 includes a message analysis unit 31 configured to analyze a message, a table storage unit 32 configured to store a tag table, a tag addition unit 33 configured to add a tag to each group of messages, an identification display control unit 34 configured to control identification and display of a message on the display unit 20, a message storage unit 35 configured to store a message, a tag search unit 36 configured to search a tag, and an error message (error MSG) search unit 37 configured to search an error message.

The message analysis unit 31 is configured to analyze a message from the control unit 14 and to extract various items of information contained in the message.

The table storage unit 32 is configured to store a communication condition tag table in which a predetermined communication condition and a predetermined tag (name tag) are associated as detailed later.

The tag addition unit 33 is configured to detect a series of groups of messages which have a mutual association and are consecutive in time sequence among a plurality of messages analyzed by the message analysis unit 31, and to add a tag to each detected group of messages as detailed later.

The identification display control unit 34 is configured to display a group of messages with a tag in time sequence on the display unit 22 under a message identification display condition set in the operation unit 21. Consequently, various messages exchanged between the mobile communication terminal 2 and the pseudo base station 10 are displayed as trace information arranged in a communication sequence order on the display unit 22. The identification display control unit 34 includes a cursor display unit 34a configured to display at least one message with the cursor thereon on the display unit 22 according to the operation contents of the operation unit 21.

The message storage unit 35 is configured to store the trace information displayed on the display unit 22 by the identification display control unit 34 in a state where a tag and a group of messages are associated.

The tag search unit 36 is configured to search a tag designated by the operation unit 21 from the data stored in the message storage unit 35.

The error message search unit 37 is configured to search an error message designated by the operation unit 21 from the data stored in the message storage unit 35.

Figure 2:
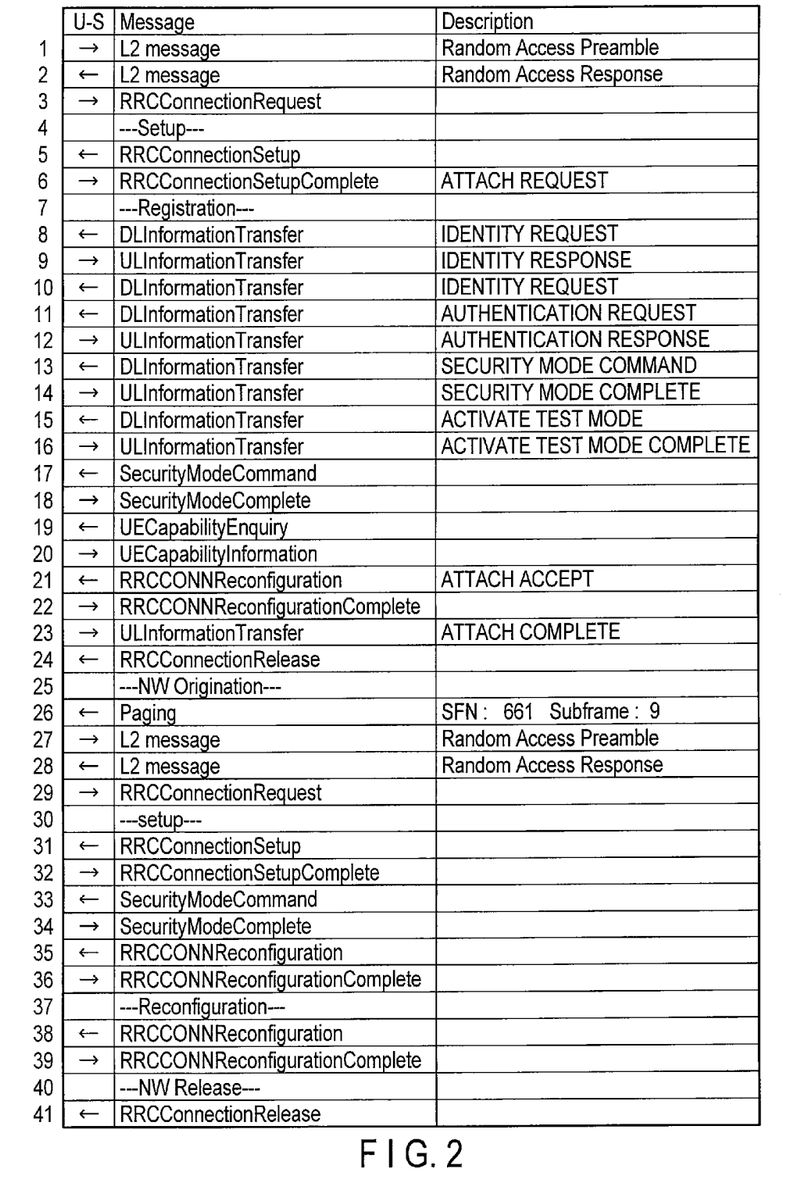
FIG. 2 shows an example of trace information displayed after a tag addition unit adds a plurality of tags when a pseudo base station communicates with a mobile communication terminal based on LTE communication standard in the test apparatus shown in FIG. 1.

FIG. 2 shows exemplary trace information based on LTE communication standard. The trace information is exchanged when the tag addition unit 33 adds a plurality of tags and then the pseudo base station 10 and the mobile communication terminal 2 make communication. In FIG. 2, "U" indicates the mobile communication terminal 2 and "S" indicates the pseudo base station 10 in the uppermost "U-S" column. A "Message" column describes therein a message exchanged between the mobile communication terminal 2 and the pseudo base station 10. A "Description" column describes therein a description of a message. A direction of an arrow in the "U-S" column indicates a direction in which a message is sent. For example, a right arrow indicates a message from the mobile communication terminal 2 toward the pseudo base station 10 (in the upward direction). A number described to the left of the "U-S" column indicates a row number appended for description. A larger row number indicates a newer message.

The tag will be first described. For the trace information shown in FIG. 2, "Setup" described in the fourth row, "Registration" described in the seventh row, "NW Origination" described in the 25th row, "Setup" described in the 30th row, "Reconfiguration" described in the 37th row, and "NW Release" described in the 40th row correspond to the tags according to the present invention, respectively. "NW" is an abbreviation of "Net Work" herein.

Figure 3:
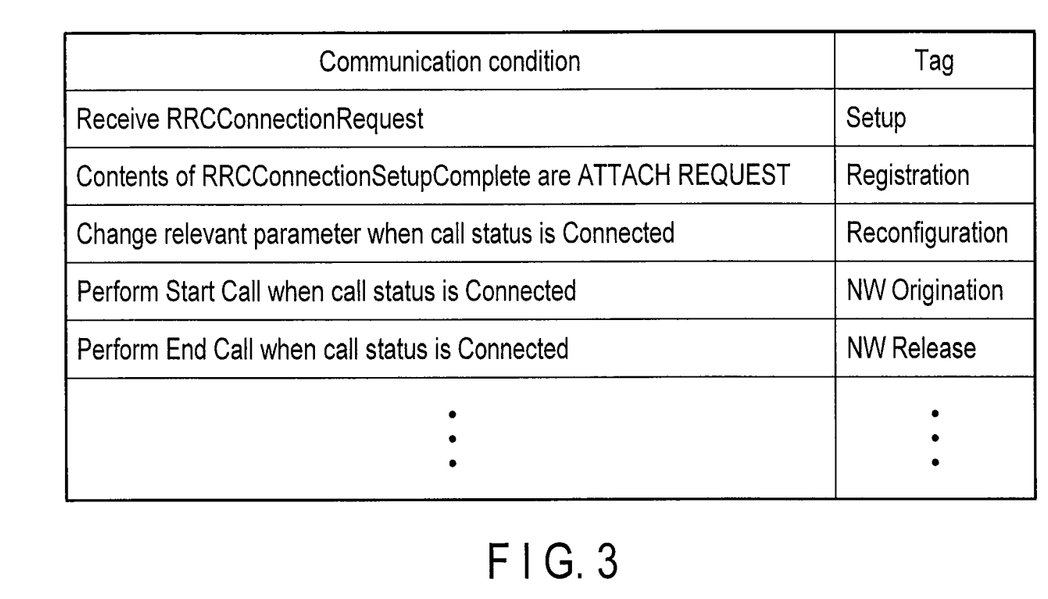
FIG. 3 shows an exemplary communication condition tag table in the test apparatus shown in FIG. 1.

The tags are added by the tag addition unit 33 with reference to the communication condition tag table stored in the table storage unit 32. An exemplary communication condition tag table is shown in FIG. 3. As shown in FIG. 3, the communication conditions and the tags are previously associated in the communication condition tag table. When the communication conditions shown in FIG. 3 are contained in the information analyzed by the message analysis unit 31, the tag addition unit 33 adds a relevant tag to the header of the group of messages corresponding to the communication condition. The header of the group of messages indicates a display position immediately before a series of messages configuring the group of messages.

For example, in FIG. 3, when the message analysis unit 31 analyzes that the message "RRCConnectionRequest" indicated in the first row has been received by the pseudo base station 10, the tag addition unit 33 adds the tag "Setup" to the header of the corresponding group of messages. "RRC" is an abbreviation of "Radio Resource Control" herein.

Figure 4A:
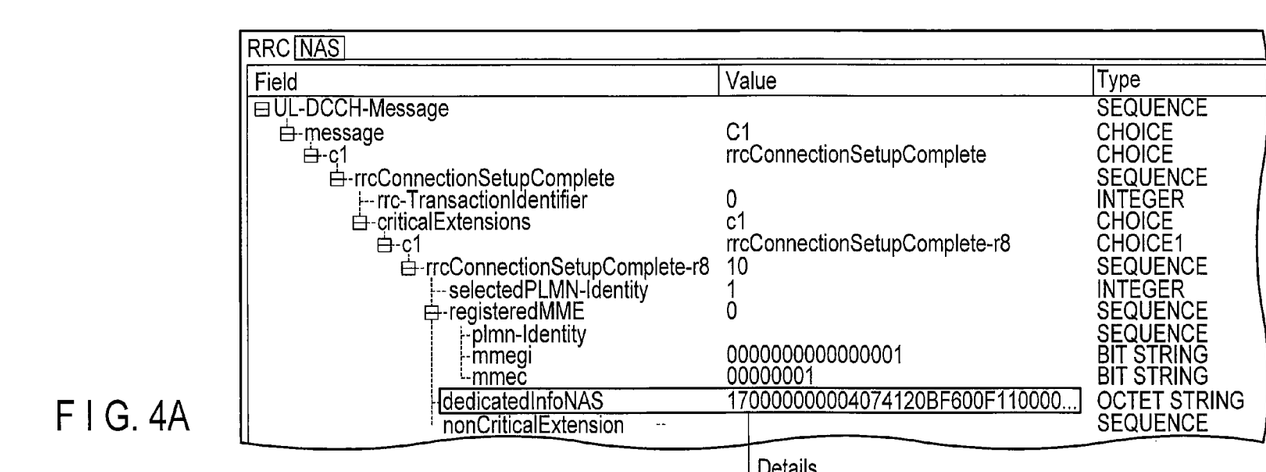
FIGS. 4A and 4B show exemplary analysis contents of a message analyzed by a message analysis unit in the test apparatus shown in FIG. 1.
Figure 4B:
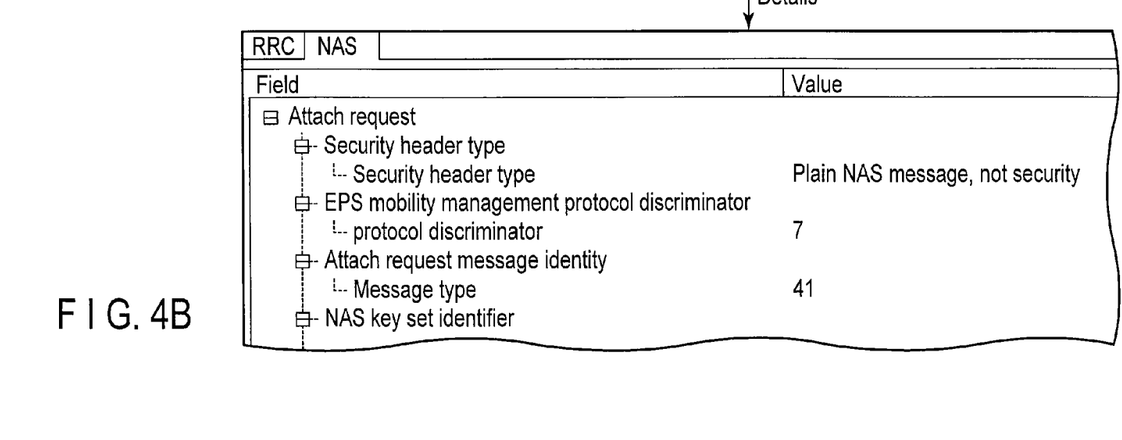

The tags will be further specifically described with other examples. In FIG. 2, it is assumed that the message analysis unit 31 receives the message "RRCConnectionSetupComplete" indicated in the sixth row. It is assumed that as a result of the analysis of the message by the message analysis unit 31, the information "dedicatedInfoNAS" is contained therein as shown in FIG. 4A and the information "Attach request" is contained therein as shown in FIG. 4B. In this case, the tag addition unit 33 refers to the communication condition tag table and performs a processing of inserting the tag "Registration." "NAS" is an abbreviation of "Non-Access Stratum" herein. That is, the tag addition unit 33 inserts the tag "Registration" after the message "RRCConnectionSetupComplete" indicated in the sixth row. The tag addition unit 33 performs the insertion processing, sequentially confirms the subsequent messages, and handles the messages until the appearance of the communication condition described in the communication condition tag table as the same group of messages. In FIG. 2, the tag "Registration" is added to "DLInformationTransfer" in the eighth row to "RRCConnectionRelease" in the 24th row as one group of messages.

The data in the group of messages added with the tag is stored as the trace information in the message storage unit 35.

The data stored in the message storage unit 35 is subjected to predetermined processings by the tag search unit 36 and the error message search unit 37.

Figure 5:
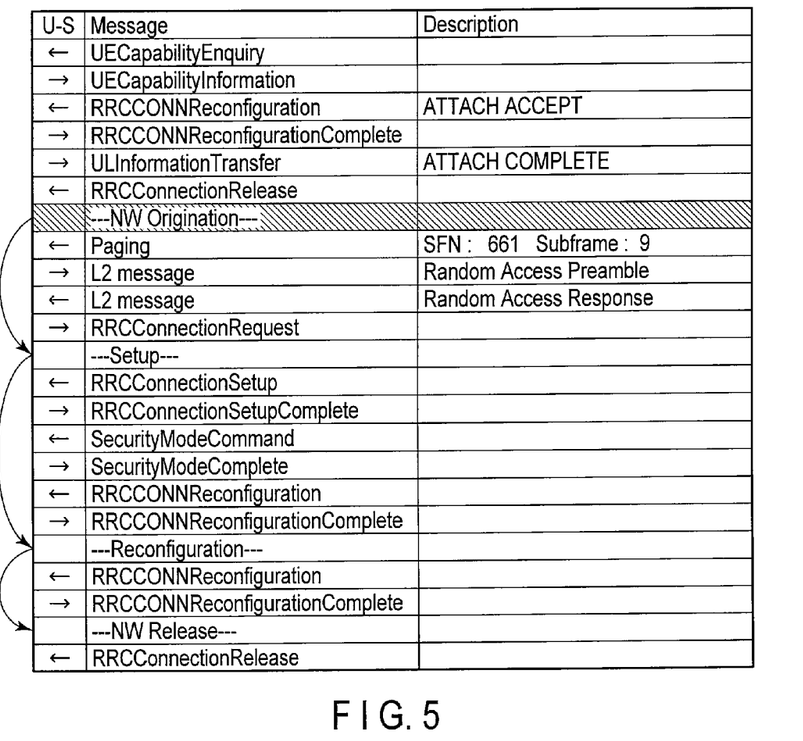
FIG. 5 shows an exemplary screen of search results of a tag search unit in the test apparatus shown in FIG. 1.

The function of the tag search unit 36 will be first described. The trace information stored in the message storage unit 35 contains a large number of tags and groups of messages. The tag search unit 36 has a function of searching a tag designated by a tester among a large number of tags. For example, when the tester operates the operation unit 21 to designate "NW Origination" as a tag to be searched, the tag search unit 36 searches the relevant tag from the data in the message storage unit 35. Thus, the identification display control unit 34 displays the screen of search results shown in FIG. 5 on the display unit 22. FIG. 5 shows a state in which the cursor is placed on the tag "NW Origination." When the tester presses a search button (not shown), the cursor jumps to another tag "NW Origination" each time the tester presses the search button (not shown). Consequently, the tester can easily find a tag to be tested from enormous tags.

The tag search unit 36 has a function of jumping among tags in the tag-added order or in its reverse order. For example, in FIG. 5, when the cursor is placed on the tag "NW Origination", the cursor is shifted from "Setup" to "Reconfiguration" and shifted from "Reconfiguration" to "NW Release" as indicated by the arrow in the Figure by use of the function. Consequently, the tester can search the tags while confirming the contents of the group of messages, for example.

The function of the error message search unit 37 will be next described. The trace information stored in the message storage unit 35 may contain an error message. The error message search unit 37 has a function of searching an error message from a large amount of trace information.

Figure 6:
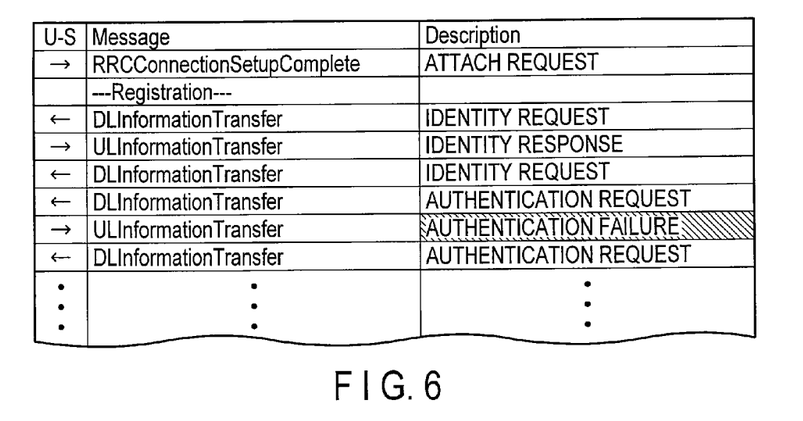
FIG. 6 shows an error message detected by an error message search unit in the test apparatus shown in FIG. 1.

For example, when the tester operates the operation unit 21 to designate a predetermined error message, the error message search unit 37 searches the designated message from the trace information which is stored in the message storage unit 35. For example, when the error message "AUTHENTICATION FAILURE" is to be searched, the message with the cursor placed thereon is displayed on the display unit 22 as shown in FIG. 6. Consequently, the tester can easily confirm the contents of the error message and where an error occurred.

The function of the identification display control unit 34 will be next described. The identification display control unit 34 has a function of identifying and displaying the message displayed on the display unit 22 under the identification display condition set in the operation unit 21. For example, the identification display control unit 34 can blink the characters of the tag searched by the tag search unit 36 or display the characters of the error message searched by the error message search unit 37 in red.

Figure 7:
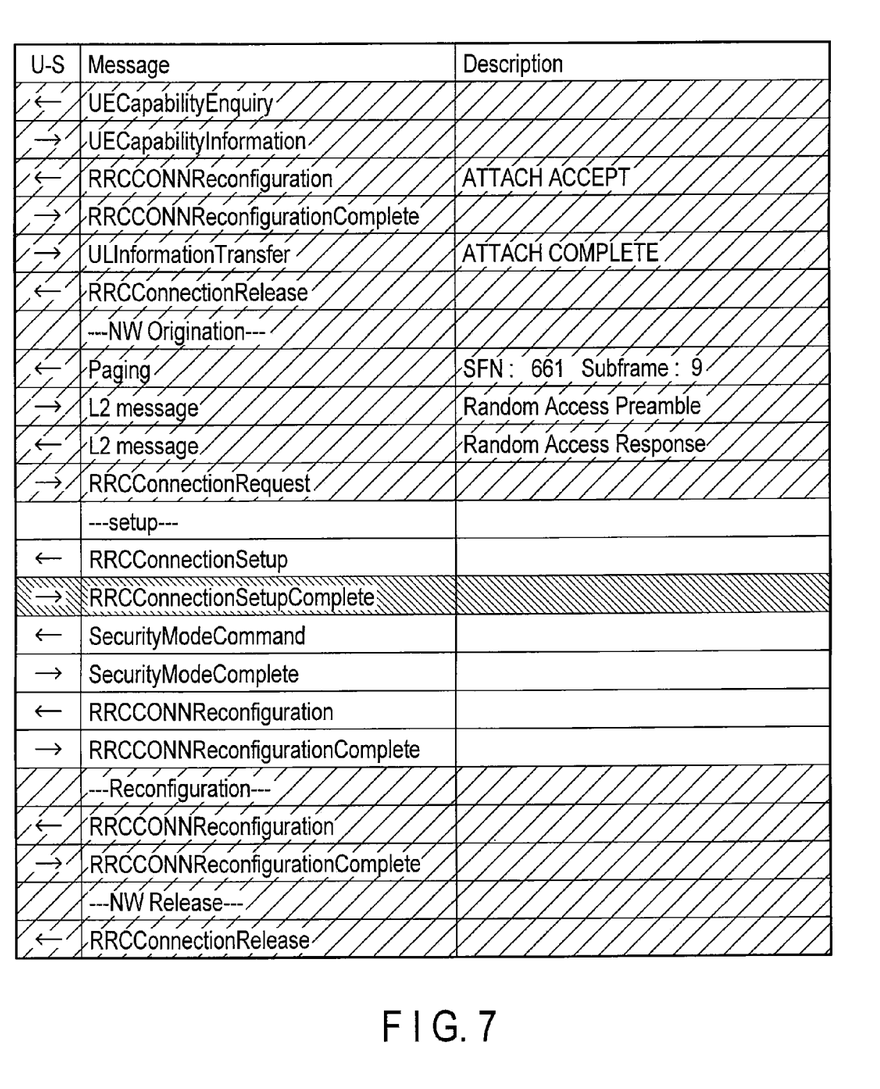
FIG. 7 shows an example in which an identification display control unit identifies and displays trace information in the test apparatus shown in FIG. 1.

The identification display control unit 34 can identify and display the group of messages containing a message with the cursor placed thereon in a different display form from other group of messages. For example, the identification display control unit 34 may identify and display the tag as shown in FIG. 7. In FIG. 7, the cursor is placed on the message "RRC-ConnectionSetupComplete" in the group of messages added with the tag "Setup." In this case, the identification display control unit 34 can highlight the group of messages added with the tag "Setup" and thus display the same more apparently than other groups of messages.

Figure 8:
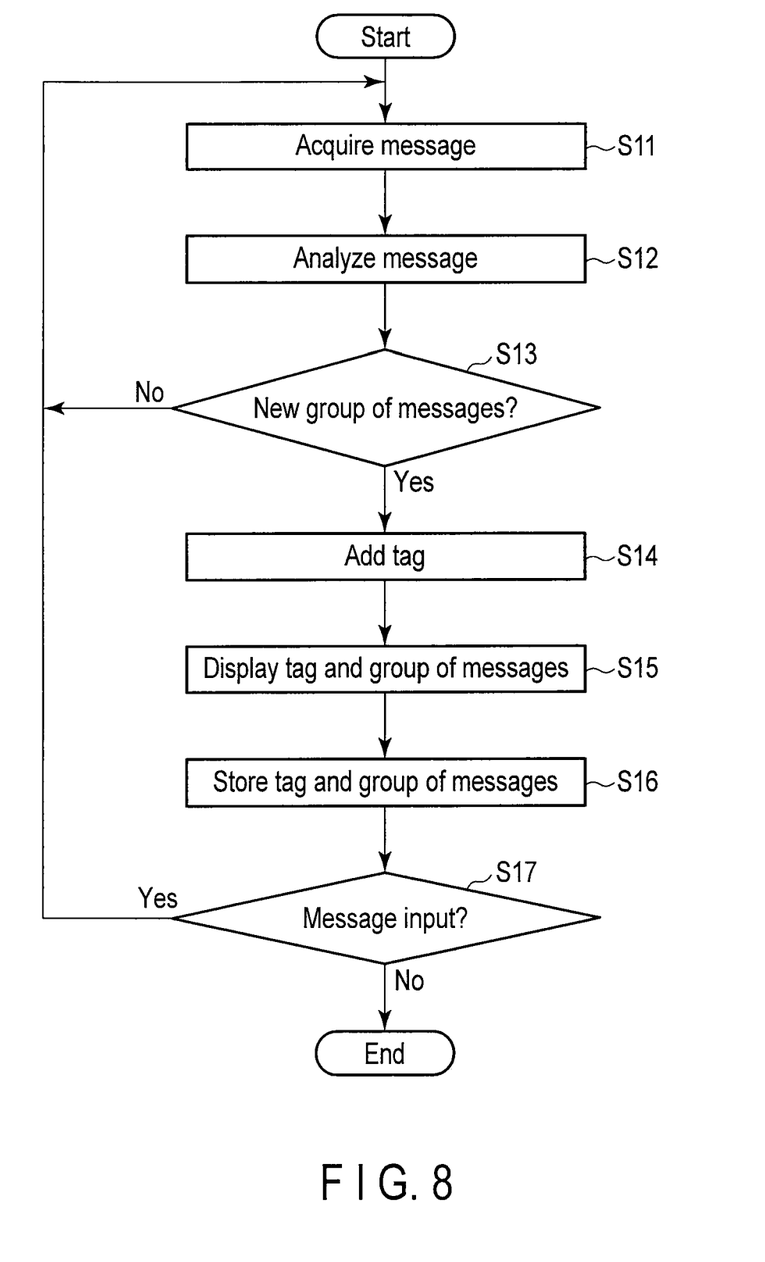
FIG. 8 is a flowchart of an embodiment of the test apparatus shown in FIG. 1.

The operation of the test apparatus for mobile communication terminal 1 according to the present embodiment will be described below with reference to FIG. 8. It is assumed that the pseudo base station 10 is making communication with the mobile communication terminal 2 according to the test procedure stored in the test procedure storage unit 14a.

First, the message analysis unit 31 acquires a message from the control unit 14 (step S11) and analyzes the message (step S12).

Then, the tag addition unit 33 determines whether the acquired message belongs to a different group of messages (called "a new group of messages" below) from the group of messages to which the last-received message belongs (step S13).

When the acquired message is transmitted from the pseudo base station 10 toward the mobile communication terminal 2, the tag addition unit 33 can easily decide whether the acquired message belongs to a new group of messages. On the other hand, when the acquired message is transmitted from the mobile communication terminal 2 toward the pseudo base station 10, the tag addition unit 33 can easily decide whether the acquired message belongs to a new group of messages with reference to the communication condition tag table as described in FIGS. 2 to 4, for example. When the acquired message is the first message from the pseudo base station 10, the tag addition unit 33 decides that the acquired message belongs to a new group of messages, and adds a predetermined tag thereto with reference to the communication condition tag table.

In step S13, when the acquired message does not belong to a new group of messages, the processing returns to step S11, where the message analysis unit 31 acquires a new message.

On the other hand, in step S13, when the acquired message belongs to a new group of messages, the tag addition unit 33 adds a tag with reference to the communication condition tag table (step S14).

Then, the identification display control unit 34 performs a display control processing of displaying tags and a group of messages (that is, a series of messages configuring the group of messages) on the display unit 22, and the display unit 22 displays the tags and the group of messages thereon (step S15).

The identification display control unit 34 stores the tags and the group of messages in the message storage unit 35 (step S16).

Then, the message analysis unit 31 decides whether to input a new message (step S17), and when a new message is to be input, the processing returns to step S11, and when a new message is not to be input, the processing terminates.

As described above, with the test apparatus for mobile communication terminal 1 according to the present embodiment, the tag addition unit 33 detects a series of groups of messages having a mutual association, and adds a tag to each detected group of messages, thereby displaying the messages with higher visibility than ever.

There has been described in the above embodiment that the test apparatus for mobile communication terminal according to the present invention tests a mobile communication terminal which makes communication based on LTE communication standard, but the present invention is not limited thereto, and similar effects can be obtained for a mobile communication terminal making communication based on other than LTE communication standard.

As described above, according to the embodiment of the present invention, it is possible to provide a test apparatus for mobile communication terminal suitable for testing a mobile communication terminal such as cell phone or mobile terminal capable of displaying a message with higher visibility than ever, and a message display method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A test apparatus for a mobile communication terminal comprising:
    a pseudo base station configured to exchange messages with the mobile communication terminal to be tested;
    a display unit configured to display a table having message items arranged in a row; and
    a display control unit configured to display a plurality of messages exchanged by the pseudo base station, wherein the messages are allocated in time sequence to the message items in the row of the table on the display unit,
    wherein the display control unit comprises:
    a message analysis unit configured to acquire and analyze the messages from the pseudo base station; and
    a tag addition unit configured to detect a group of messages configured of a series of messages which have a mutual association and are consecutive in time sequence among the messages analyzed by the message analysis unit and to add a tag for identifying each group of messages to each detected group of messages, and
    the display control unit displays the tag together with the series of messages, wherein the tag is allocated to one of the message items in the row of the table on the display unit so as to identity the respective groups of messages allocated to the message items in the row of the table, and the tag associated with the group of messages is located in the one of the message items immediately before the series of messages configuring the group of messages.

2. The test apparatus for the mobile communication terminal according to claim 1, wherein the display control unit further comprises a table storage unit configured to store a communication condition tag table associating a predetermined communication condition with the tag, and
    the tag addition unit detects the group of messages based on the communication condition tag table and adds the tag thereto.

3. The test apparatus for the mobile communication terminal according to claim 1, wherein the display control unit further comprises a tag search unit configured to search a predetermined tag from a plurality of tags and a plurality of groups of messages associated with the tags, and displays a tag searched by the tag search unit and the series of messages configuring the group of messages associated with the tag on the display unit.

4. The test apparatus for the mobile communication terminal according to claim 1, wherein the display control unit further comprises a cursor display unit configured to display a cursor indicating that a message displayed on the display unit is selected on the display unit, and
    an identification display control unit configured to identify and display at least one message displayed on the display unit, and
    the identification display control unit identifies and displays a group of messages containing a message selected by the cursor and a group of messages not containing a message selected by the cursor on the display unit.

5. The test apparatus for the mobile communication terminal according to claim 1, wherein the display control unit identifies and displays an error message indicating an error among the messages and a non-error message associated with the error message on the display unit.

6. The test apparatus for the mobile communication terminal according to claim 5, wherein the display control unit further comprises an error message search unit configured to search the error message, and identifies and displays an error message searched by the error message search unit on the display unit.

7. The test apparatus according to claim 1, wherein the tag is displayed in the one of the message items with symbols, wherein the tag is specified by locating the tag between the symbols.

8. A message display method for testing a mobile communication terminal comprising:
    exchanging messages with the mobile communication terminal to be tested; and
    displaying a table having message items arranged in a row and allocate the exchanged messages in time sequence on message items, respectively,
    the method comprising;
    a message analysis step of acquiring and analyzing the exchanged messages; and
    a tag addition step of detecting a group of messages configured of a series of messages which have a mutual association and are consecutive in time sequence among a plurality of messages analyzed in the message analysis step, and adding a tag for identifying a group of messages to each detected group of messages,
    wherein the display step displays the tag together with the series of messages and the tag is allocated to one of the message items in the row of the table on the display unit so as to identify the respective groups of messages allocated to the message items in the row of the table, and the tag associated with the croup of messages is located in the one of the message items immediately before the series of messages configuring the croup of messages.

9. The message display method according to claim 8, comprising:
    storing a communication condition tag table associating a predetermined communication condition and the tag,
    wherein the tag addition step detects the group of messages and adds the tag thereto based on the communication condition tag table.

10. The message display method according to claim 8, comprising:
    searching a predetermined tag among a plurality of tags and a plurality of groups of messages associated with the tags,
    wherein the display step displays a tag searched by the tag search unit and the series of messages configuring the group of messages associated with the tag.

11. The message display method according to claim 8, comprising:
    displaying a cursor indicating that one of the displayed messages is selected; and
    identifying and displaying a group of messages containing a message selected by the cursor and a group of messages not containing a message selected by the cursor.

12. The message display method according to claim 8, comprising identifying and displaying an error message indicating an error among the messages and a non-error message associated with the error message.

13. The message display method according to claim 12, comprising:
    searching the error message, wherein the error identification display step identifies and displays an error message searched by the error message search step.

14. The message display method according to claim 8, wherein the tag is displayed in the one of the message items with symbols, wherein the tag is specified by locating the tag between the symbols.

* * * * *